United States Patent

Hurtt

[15] 3,647,934
[45] Mar. 7, 1972

[54] LIQUIDTIGHT CONNECTOR

[72] Inventor: Terry J. Hurtt, Aurora, Ill.
[73] Assignee: All-Steel Equipment Inc.
[22] Filed: Mar. 5, 1970
[21] Appl. No.: 16,696

[52] U.S. Cl. ...........................174/65 R, 174/78, 285/161, 285/248
[51] Int. Cl. ..........................................H02g 3/06
[58] Field of Search..................285/248, 249, 247, 245, 161, 285/158; 174/65 R, 65 SS, 75 C, 78

[56] References Cited

UNITED STATES PATENTS

| 3,227,803 | 1/1966 | Gohs | 174/78 |
| 3,424,853 | 1/1969 | Johnson | 174/78 |
| 3,492,410 | 1/1970 | Kelly | 285/248 X |
| 2,255,673 | 9/1941 | McDermott | 285/161 X |
| 2,782,060 | 2/1957 | Appleton | 285/248 |
| 616,808 | 12/1898 | Ricketts | 285/161 X |
| 3,206,232 | 9/1965 | Gleason et al. | 285/161 |
| 1,809,582 | 6/1931 | Church | 285/161 X |

FOREIGN PATENTS OR APPLICATIONS 919,848 2/1963 Great Britain..........................285/249

Primary Examiner—Thomas F. Callaghan
Attorney—Mann, Brown, McWilliams & Bradway

[57] ABSTRACT

A liquidtight connector for connecting sheathed flexible conduit to switch or outlet boxes and the like in which the cutoff end of the conduit has applied thereto a ferrule that has a threaded connection with the conduit and defines an outer portion which is received over the conduit sheathing and terminates in an outwardly flared lip. The ferrule covered end of the conduit is received within one end of the connector body, with the ferrule being proportioned such that its lip seats against the terminal portion of the said connector one end. A contractable gland received over the conduit is clamped by a seal nut against the lip of the ferrule to contract same into liquidtight relation with the conduit. The other end of the connector body is secured to the box by a conventional lock nut in the case of knockout openings with an O-ring seal and retainer therefore being employed between the box wall and the connector body, and in the case of hub-type openings, the other end of the connector body is applied directly thereto.

4 Claims, 5 Drawing Figures

Patented March 7, 1972

INVENTOR
TERRY J. HURTT

BY
Mann, Brown, McWilliams & Bradway
ATTORNEYS

INVENTOR
TERRY J. HURTT 3,647,934

LIQUIDTIGHT CONNECTOR

This invention relates to liquidtight connectors, and more particularly, to connectors of the type for making a liquidtight connection to outlet boxes and the like, of liquidtight flexible metallic conduit.

Liquidtight flexible metallic conduit conventionally comprises a metallic core of spiral convolute form covered by a liquidtight sheath that may be formed from a suitable flexible material such as rubber or the like. Use of conduit may be formed from a suitable flexible material such as rubber or the like. Use of this type usually requires that the attachment of same to outlet boxes, switch boxes, and the like be also liquidtight or waterproof in nature.

A principal object of this invention is to provide a connector device for securing the ends of liquidtight conduits to outlet boxes, switch boxes, and the like, which device is liquidtight in nature and result.

Another principal object of the invention is to provide a connector device of the type indicated in which a grounded liquidtight flexible metallic conduit connection is provided without penetrating the conduit sheathing.

Another principal object of the invention is to provide a liquidtight connector embodying few and simple parts that will reliably establish the liquidtight characteristics that are desired, and that are all reusable in nature.

Still other objects of the invention are to provide a liquidtight connector that is economical of manufacture, convenient to use, long lived in application, and reusable in nature.

In accordance with this invention, the cutoff end of the conduit has applied thereto a ferrule having an inner portion formed for threaded engagement with the metal core of the conduit, and an outer portion which overlies the conduit end and terminates in an outwardly flared lip. The ferrule covered end portion of the conduit fits within one end of a double-ended connector body, the other end of which is proportioned for application to the usual knockout hole of outlet boxes and the like. The ferrule is proportioned such that its lip seats against the terminal portion of the connector body end in which the ferrule is disposed to provide a 360° ground with the connector body. Also applied over the conduit end are a split gland and a seal nut, with the latter being threadable on the connector body end in which the ferrule is received, and including a cam surface that engages the gland to clamp same against the ferrule lip, whereby the gland is cammed into contracted sealtight relation with the conduit sheathing.

Other objects, uses, and advantages will be obvious or become apparent from a consideration of the following detailed description and the application drawings.

In the drawings:

FIG. 4 is a view similar to that of FIG. 1 showing a connector in accordance with this invention adapted for application to hub assemblies and the like.

However, it is to be understood that the specific embodiment illustrated is provided primarily to comply with the requirements of the Patent Code, and the invention may have other specific embodiments that will be obvious to those skilled in the art and are intended to be covered by the appended claims.

Figure 1:
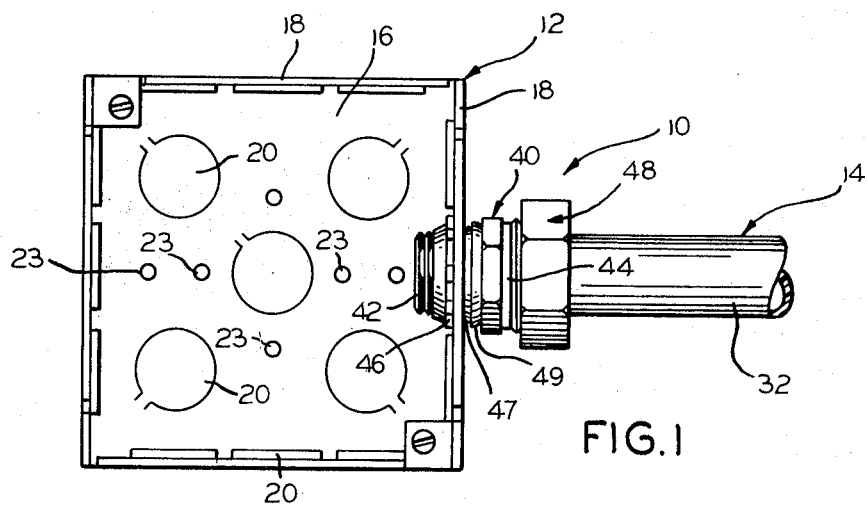
FIG. 1 is a plan view of an outlet box having applied thereto one embodiment of this invention to connect liquidtight flexible metallic conduit thereto.

Reference numeral 10 of FIG. 1 generally indicates one embodiment of the liquidtight connector of this invention that is adapted for application to an outlet box 12 for the purpose of securing same to conduit 14.

The box 12 is entirely conventional in nature, and is intended to represent any form of outlet box, switch box, and other structures of this type to which the connector 10 may be applied. Box 12 in the form shown includes bottom wall 16 and sidewalls 18, each formed with the familiar knockouts 20, each of which, when removed, defines a plain or unthreaded box opening 22 (see FIG. 2) that is characteristic of stamped metal boxes, to which the connector 10 is applied. The box bottom wall 16 may also be formed with suitable holes 23 to receive securing nails or the like, as will be apparent to those skilled in the art.

The conduiting 14 will be recognized as being of the conventional liquidtight flexible metallic type employing a metallic core 24 defined by spirally wound metallic stripping 26 having partially overlapping convolutions 28 that define an internal spiral groove 30, which core 24 is enclosed by a protective sheath 32 formed from a suitable resilient yieldable material, such as natural or synthetic rubber of their equivalents. The core 24 is thus tubular in nature to receive electric wiring that is to extend into the box 12.

The connector 10 generally comprises a connector body 40 defining a tapered threaded end portion 42 and a straight or untapered end portion 44, a lock nut 46, O-ring seal 47, and retainer disc 49 for seal 47 that are received on connector body portion 42, a ferrule 50 that is received over the cutoff end 52 of the conduit 14 and is received within the connector body 40, and a contractable gland 54 that is applied over the conduit 14 and is clamped by the seal nut against the ferrule 50 to contract same into sealing relation with the external surface 56 of the conduit 14.

Figure 2:
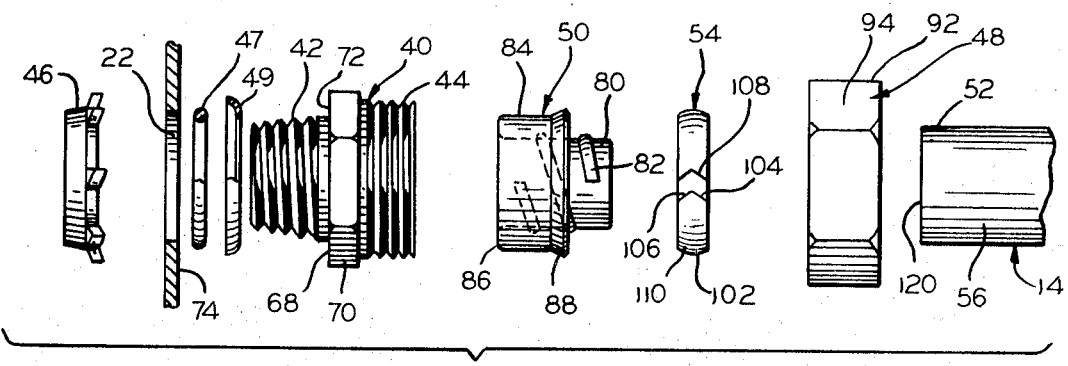
FIG. 2 is an exploded plan view of the connector of FIG. 1, including the portion of the box wall to which it is connected and the end portion of the flexible conduit that is connected to the box wall.
Figure 3:
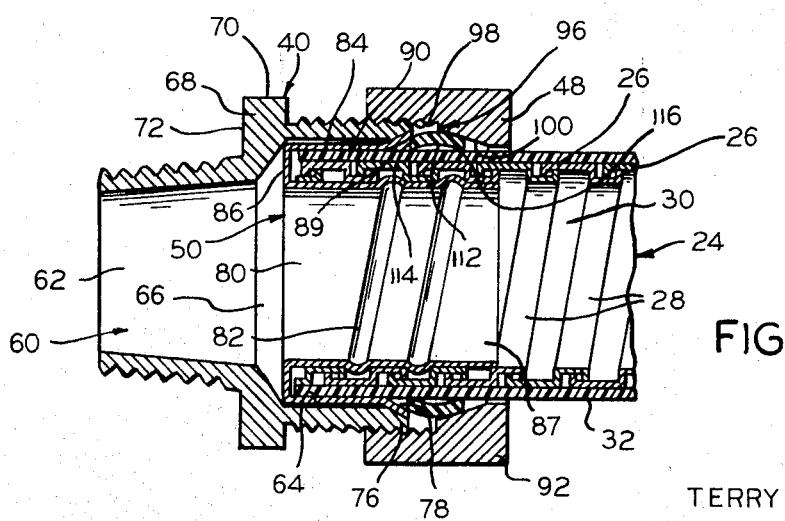
FIG. 3 is a sectional view through the connector body of FIGS. 1 and 2 as applied to the conduit end, with the box wall and locknut omitted, and the connector parts shown in position to draw the device gland into sealing relation with the conduit.

As seen in FIG. 3, the connector body defines a bore 60 of stepped diameter configuration including bore portion 62 separated from bore portion 64 by a tapered annular surface 66. As indicated in FIG. 2, the end portion 42 of the connector body 40 is of less diameter than the end portion 44, and it is proportioned to be applied in a conventional manner to the box opening 22 formed by eliminating one of the knockouts 20 for application thereto of conventional locknut 46. Connector body 40 defines intermediate the end portions 42 and 44 a ridge portion 68 that has a hex-shaped periphery 70 and defines an abutment wall 72 between which and the box wall 16 or 18, O-ring 47 and retainer 49 are received when the locknut 46 is tightened into place in the well-known conventional manner.

The end portion 44 of the connector body 40 is proportioned to closely receive the cutoff end 52 of the conduit 14 with the ferrule 50 applied thereto. The terminal edge portion 76 of same is formed to define the annular beveled chamfer surface 78 that is shown in FIG. 3.

The ferrule 50 comprises an inner annular sleeve portion 80 that is provided with a spiral indentation 82 which complements the spiral groove 30 of the conduiting core 24 for purposes of turning the ferrule into firm engagement with the conduiting cutoff end 52. The ferrule 50 also includes an outer annular sleeve portion or skirt 84 extending from the end portion 86 of the ferrule toward the other end 87 of the ferrule and defining an outwardly flared lip 88 which is proportioned to seat against the annular surface 78 of connector body 40, when the ferrule is applied to the bore 64 of the connector body. Lip 88 defines a tapered cam surface 89 that is to cooperate with the gland 54 in the manner about to be described. The annular portions 80 and 84 and the ferrule define a pocket 90 in which the cutoff end portion 52 of the conduit 14 is contained when the ferrule is threaded into place on the conduiting end in the manner indicated in FIG. 3. Ferrule end portion 86 may be squared (as shown) or rounded, as desired.

Seal nut 48 comprises an annular member 92 having a hex-shaped periphery 94 and defining a bore 96 that is internally threaded as at 98 (see FIG. 3) for application to the threading of connector body end portion 44. The bore 96 of nut 48 is also formed to define annular tapered cam surface 100 that engages the gland 54 when assembling the coupling 10.

The gland 54 comprises an annular member 102 formed from a suitable plastic material and having an internal diameter which is somewhat less than the external diameter of the conduit sheathing 32. The gland element 54 is split as at 104 and is proportioned so that in its uncontracted relation, in which the gland end portions 106 and 108 are spaced from each other, the gland loosely fits over the exterior surface 56 of conduit 14. The gland element about its periphery defines a convexly contoured surface 110 for cooperation with the cam surface 100 of the seal nut 48 and the annular cam surface 89 that is defined by the ferrule lip 88.

As indicated in FIG. 3, the undersurface 112 of the gland is concave in nature such that the gland defines a pair of annular edge portions 114 and 116 which engage the surface 56 of the conduit sheathing 32.

The connector 10 may be employed to attach the conduiting 14 to a box, such as box 12, by first removing an appropriate knockout 20 to open a desired opening 22. The seal nut 48 and the gland 54 are then slipped over the end of the conduit, in that order, with the nut 48 being oriented so that its threading will be at the end of the nut that faces the end 52 of the conduit 14. The ferrule 50 may then be applied to the end 52 of the conduiting (it being assumed that the end 52 has previously been formed by a suitable cutting operation to define a terminal portion 120 that extends transversely of the conduiting). To do this, the ferrule is oriented to dispose the spiral indentation 82 of its inner portion 80 in alignment with the spiralled groove 30 of the conduit core 24, and then the ferrule is threaded onto the conduit end by turning same relative to a core 24, which results in the end 52 of the conduit 14 being fully disposed within the pocket 90 defined by the ferrule in the manner indicated in FIG. 3 and the ferrule portion 80 being in good electrical contact relation with core 24.

The ferrule that is thus applied to the conduit end is inserted within the bore portion 64 of the connector body 40 to bring the chamfer surface 78 of the connector body 40 into engagement with the ferrule lip 88, whereupon the gland 54 is moved up against the cam surface 89 defined by the lip and nut 48 is threaded onto body end portion 44. Threading of the nut 48 onto the connector body end portion 44 draws the cam surface 100 of the nut 48 against the peripheral surface 100 of the gland, which surface 110 if not already in contact with the cam surface 89, is now moved into engagement with the surface 89 of the ferrule lip. The camming action of the surfaces 100 and 89 on gland surface 110 contracts the gland 54 to draw its end portions 106 and 108 into substantial juxtaposition or engagement with each other whereby the gland is somewhat pressed into and tightly engages the surface 56 of the conduit sheathing 32 in a sealtight manner.

It is to be noted that while the sheathing surface 56 will be indented due to the contraction of the gland 54 that is involved, it will not be severed or penetrated in any manner, and the resilient nature of the sheathing 32 in reacting to the compression action generated on it by the gland insures an effective sealing relation longitudinally of the conduit at the gland edge portions 114 and 116.

It will also be noted that the ferrule lip 88 is held in firm electrical contact relation with connector body 40, which contact thus completes the ground between core 24 and connector body 40, with the grounding connection to the body 40 being substantially 360° about the axis thereof.

The connector body end portion 42 then may have applied thereto the retainer disc 49 and seal 47 in that order, and this assembly is applied to the box opening 22 and the locknut 46 turned thereon for locking the connector body to the box in the usual conventional manner and effecting a liquidtight seal between the body 40 and the box. Assuming box 12 is grounded in a suitable conventional manner, the core 24 of conduit 14 will now be grounded through ferrule 50, body 40 and nut 46.

Alternately, the connector body 40 can first be applied to the box by application of its end portion 42 to the knockout opening in the manner indicated followed by application of the lock nut 46 thereto in the well-known conventional manner, with the conduit 14 then being applied to the connector body end portion 40 in the manner described immediately above.

Figure 4:
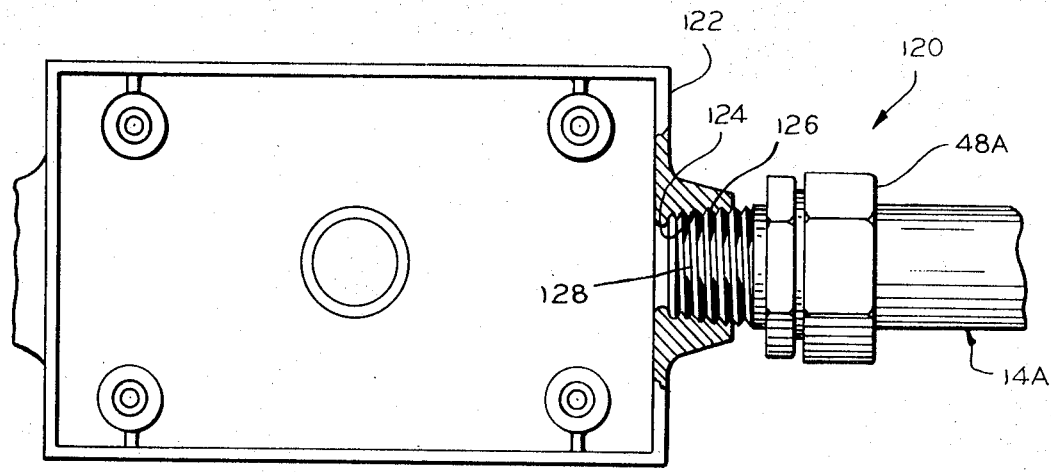
Figure 5:
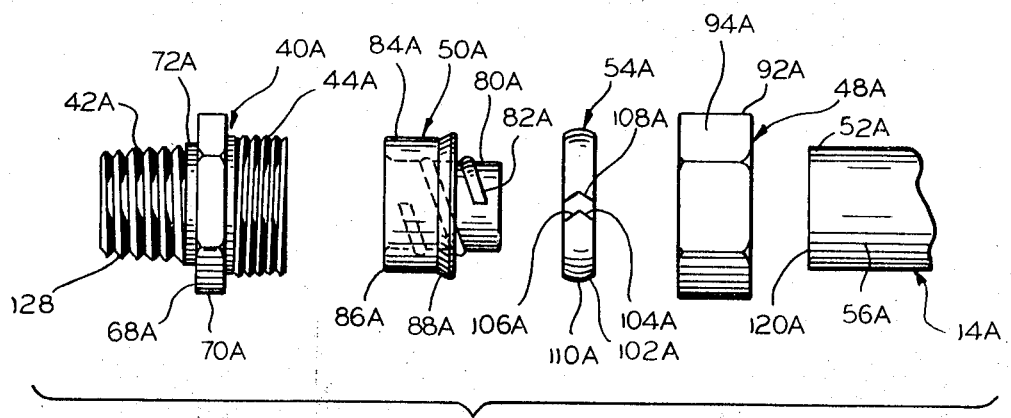
FIG. 5 is an exploded plan view of the connector of FIG. 4.

Reference numeral 120 of FIG. 4 generally indicates an embodiment of the liquidtight connector of this invention that is adapted for application to a hub-type application opening 124 of box 122 for the purpose of securing same to conduit 14A.

The box 122 is entirely conventional in nature, and is intended to represent any form of box or receptacle turned with a conventional tapered threaded opening or hub 124 for application thereto of electrical connectors or fittings. As is conventional, the threads 126 of opening 124 are tapered. The conduiting 14A is the same as conduiting 14 of FIGS. 1–3 and the connector 120 generally comprises a connector body 40A that is the same as body 40 and defines threaded end portions 42A and 44A, a seal nut 48A that is received on connector body portion 44A, a ferrule 50A that is received over the cutoff end 52A of the conduit 14A and is received within the connector body 40A, and a contractable gland 54A that is applied over the conduit 14A and is clamped by the seal nut against the ferrule 50A to contract same into sealing relation with the external surface 56A of the conduit 14A. The threaded end portion 42A of body 40 is tapered to complement the taper of threading 126 of hub 124. The other parts of the connector 120 are the same as connector 10, except locknut 46, seal 47 and retainer 49, which are omitted.

The connector 120 may be employed to attach the conduiting 14A to the hub-type opening 124 by applying the conduiting 14A to body 40A in the manner described in connection with body 40, and then turning the connector body end portion 42A into tight threaded engagement with the threaded opening 124 of hub 122. The tapered threading of hub opening 124 and connector body portion 42A eliminates the need for a seal comparable to O-ring seal 47 in connection with connector 120, the conduit core thus being grounded through ferrule 50A, body 40 and hub 124.

Alternately, the connector body 40A can first be applied to the hub by application of its end portion 42A to opening 124 in the manner indicated with the conduit 14A then being applied to the connector body end portion 40 in the manner described above.

It will therefore be seen that this invention provides a liquidtight coupling of few and simple parts that can readily be applied to waterproofed conduiting to provide an effective and reliable liquidtight seal at the box or other structure to which the conduiting is to be connected. The split nature of the gland and the manner of its application to the conduit accommodates some variation in external diameter of the conduiting without materially affecting the resulting seal in an adverse manner.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A liquidtight connector for application to the cutoff end of liquidtight flexible metallic conduit of the type including a resilient sheath enclosing a flexible core defined by spirally wound metal stripping forming an internal spiralled groove, said connector comprising:
   a ferrule formed from an electrically conducting material and comprising:
   an inner sleeve portion proportioned to be closely received inside the conduit core,
   said ferrule inner portion being threaded for threaded engagement with the core groove, said ferrule further defining an outer sleeve portion in concentric relation about said inner portion thereof and spaced radially from said ferrule inner portion to closely receive the cutoff end of the conduit therebetween when said inner portion thereof is threaded into the conduit core, said ferrule portions integrally merging together in a ferrule end portion, a body member comprising a tubular element having external threading at one end thereof, with said body member one end terminating in a terminal edge portion, said body member one end being proportioned to closely receive said ferrule outer portion and having its terminal edge portion formed to define an internal annular bevel surface thereabout that converges in the direction of the other end of said body member, said ferrule outer portion projecting away from said ferrule end portion and terminating in an outwardly flared annular lip substantially complementing said body member bevel surface, a contractable gland adapted to be received over the conduit end, said gland comprising a ring element formed from a flexible material and having a convexly shaped outer surface and an internal diameter proportioned to closely receive the conduit sheath, said ring element being split to define end portions that are spaced apart in the unstressed condition thereof, with said ring element being proportioned radially thereof such that when said end portions thereof are in abutting relation, the internal diameter of said ring element is less than the external diameter of the conduit sheath, and a clamp nut including a threaded portion at one end thereof adapted to be threaded on said threading of said body member one end, and an annular shoulder adjacent the other end thereof that is formed with a bevel surface facing said one end thereof and that converges in a direction away from said one end thereof, said nut shoulder having an internal diameter to closely receive the conduit sheath when said nut is applied to the conduit, whereby when said nut and said gland have been received over the conduit end in that order with said nut bevel surface facing in the direction of the conduit end, and said ferrule inner sleeve portion has been threaded into the conduit end to lodge same between said ferrule inner and outer portions, on slipping said body member one end over said ferrule outer sleeve portion and threading said nut one end onto said body member one end, said body member bevel surface is brought into abutting relation with said ferrule lip on one side of said lip and said gland is trapped between said ferrule lip on the other side of same and said nut bevel surface with said lip with said nut surface engaging said gland surface, whereby said gland may be cammed into liquidtight relation with the conduit sheath by said lip and said nut surface as said nut is further turned onto said body member one end with said gland surface being in liquidtight relation with said lip, and said ferrule lip will be held in 360° electrical conducting relation with said body member.

2. A liquidtight connection arrangement for connecting the cutoff end of liquidtight flexible metallic conduit to an electrical box or the like, wherein the conduit is of the type including a resilient sheath enclosing a flexible core defined by spirally wound metal stripping forming an internal spiralled groove, said connector arrangement comprising:

a ferrule formed from an electrically conducting material and comprising:

an inner sleeve portion proportioned to be closely received inside the conduit core, said ferrule inner portion being threaded for threaded engagement with the core groove, said ferrule further defining an outer sleeve portion in concentric relation about said inner portion thereof and spaced radially from said ferrule inner portion to closely receive the cutoff end of the conduit therebetween when said inner portion thereof is threaded into the conduit core, said ferrule portions integrally merging together in a ferrule end portion, a body member comprising a tubular element having external threading at one end thereof, with said body member one end terminating in a terminal edge portion, said body member one end being proportioned to closely receive said ferrule outer portion and having its terminal edge portion formed to define an internal annular bevel surface thereabout that converges in the direction of the other end of said body member, said body member other end being of lesser outer diameter than said one end thereof, and said member defining a hex-shaped shoulder thereabout and intermediate said ends thereof, said body member other end being received in a fitting receiving opening in the box, means for securing said member other end to the box, said ferrule outer portion projecting away from said ferrule end portion and terminating in an outwardly flared annular lip substantially complementing said body member bevel surface, a contractable gland adapted to be received over the conduit end, said gland comprising a ring element formed from a flexible material and having a convexly shaped outer surface and an internal diameter proportioned to closely receive the conduit sheath, said ring element being split to define end portions that are spaced apart in the unstressed condition thereof, with said ring element being proportioned radially thereof such that when said end portions thereof are in abutting relation, the internal diameter of said ring element is less than the external diameter of the conduit sheath, and a clamp nut including a threaded portion at one end thereof adapted to be threaded on said threading of said body member one end, and an annular shoulder adjacent the other end thereof that is formed with a bevel surface facing said one end thereof and that converges in a direction away from said one end thereof, said nut shoulder having an internal diameter to closely receive the conduit sheath when said nut is applied to the conduit, and means for forming a liquidtight seal between said member other end and the box, said nut and gland being received over the conduit end in that order with said nut bevel surface facing in the direction of the conduit end, and said ferrule inner sleeve portion being threaded into the conduit end to lodge same between said ferrule inner and outer portions, said body member one end being received over said ferrule outer sleeve portion, said nut one end being threaded onto said body member one end to bring said body member bevel surface into abutting relation with said ferrule lip on one side of said lip and trap said gland between said ferrule lip on the other side of same and said nut bevel surface with said lip and said nut surface engaging said gland surface, whereby said gland may be cammed into liquidtight relation with the conduit sheath by said lip and said nut surface as said nut is further turned onto said body member one end with said gland surface being in liquidtight relation with said lip, and whereby said ferrule lip is held in 360° electrical conducting relation with said body member.

3. The connector set forth in claim 2 wherein:

said seal forming means comprises an O-ring seal and retainer therefor interposed between said member shoulder and the box, said securing means comprising a locknut received over said member other end and turned up against the box to clamp said seal in sealing engagement therewith.

4. The connector set forth in claim 2 wherein:
said seal forming means comprises said box opening and said member other end being formed with tapered mating screw threading,
with said member other end being tightly turned into said box opening to provide both said sealing means and said securing means.